United States Patent [19]

Larson et al.

[11] Patent Number: 5,584,213

[45] Date of Patent: Dec. 17, 1996

[54] ROTATABLE GRIP FOR DERAILLEUR TYPE BICYCLE GEAR SHIFTING SYSTEM

[75] Inventors: Michael W. Larson, Chicago; Andrew J. Caron, Berwyn; John D. Cheever; Tymme A. Laun, both of Chicago, all of Ill.

[73] Assignee: SRAM Corporation, Chicago, Ill.

[21] Appl. No.: 287,721

[22] Filed: Aug. 9, 1994

Related U.S. Application Data

[63] Continuation-in-part of Ser. No. 207,249, Mar. 7, 1994, Pat. No. 5,476,019.

[51] Int. Cl.⁶ .......................... B62K 23/04; B62M 25/04
[52] U.S. Cl. ............................................. 74/551.9; 74/489
[58] Field of Search ................................. 74/551.9, 558, 74/551.8, 488, 489

[56] References Cited

U.S. PATENT DOCUMENTS

| | | | |
|---|---|---|---|
| D. 319,770 | 9/1991 | Borromeo | D8/303 |
| D. 337,859 | 7/1993 | Rommerdale | D28/62 |
| D. 361,695 | 8/1995 | Sutker | D7/401.2 |
| 1,231,055 | 6/1917 | Packard | |
| 3,020,778 | 2/1962 | Davidson | 74/489 |
| 3,522,745 | 8/1970 | Koper | 74/489 |
| 3,713,350 | 1/1973 | Brilando | 74/551.9 |
| 4,191,065 | 3/1980 | Golobay et al. | 74/489 |
| 4,201,095 | 5/1980 | Cirami | 74/217 |
| 4,267,744 | 5/1981 | Yamasaki | 74/475 |
| 4,308,762 | 1/1982 | Jannard | 74/551.9 |
| 4,384,864 | 5/1983 | Bonnard | 474/82 |
| 4,526,056 | 7/1985 | Yamanaka | 74/489 |
| 4,548,092 | 10/1985 | Strong, Jr. | 74/475 |
| 4,619,154 | 10/1986 | Yamanaka | 74/489 |
| 4,895,044 | 1/1990 | Ekins | 74/551.9 |

(List continued on next page.)

FOREIGN PATENT DOCUMENTS

| | | |
|---|---|---|
| 2082665 | 11/1992 | Canada . |
| 0294720 | 6/1988 | European Pat. Off. . |
| 0523257 | 2/1992 | European Pat. Off. . |
| 0529664 | 8/1992 | European Pat. Off. . |
| 0585473 | 9/1993 | European Pat. Off. . |
| 2210973 | 7/1974 | France . |
| 688541 | 10/1938 | Germany . |
| 9317875 | 3/1994 | Germany . |
| 5-32191 | 9/1993 | Japan . |
| 261795 | 9/1949 | Switzerland .......................... 74/488 |
| 667244 | 8/1985 | Switzerland . |
| 9278 | of 1893 | United Kingdom . |
| 19602 | of 1894 | United Kingdom .................. 74/551.9 |
| 122270 | 2/1919 | United Kingdom . |
| 2024381 | 1/1980 | United Kingdom . |
| WO9219488 | 11/1992 | WIPO . |
| WO9402348 | 2/1994 | WIPO . |

OTHER PUBLICATIONS

SRAM Corporation Drawings, Apr. 22, 1992 –Representation of handgrip designs available to the public more than one year prior to filing of this application.

*Primary Examiner*—Rodney H. Bonck
*Assistant Examiner*—Mary Ann Battista
*Attorney, Agent, or Firm*—Jefferson Perkins

[57] ABSTRACT

A rotatable gripping surface for a derailleur-type bicycle gear shifting system is formed of a resilient material with axially extending alternating ribs and grooves. The ribs and grooves are spaced such that they fit naturally into the crooks of the rider's thumb and finger or fingers and the portion of the palm therebetween. The ribs provide an increased diameter to aid in the transmission of torque and to protrude above any mud which may have collected thereon. To further enhance the torque transmitting capabilities of the grip and the ability to remain effective in the presence of mud and other debris, the surfaces of the ribs are provided with a pattern of nubs. The hubs are engaged and deflected slightly by an operator's thumb and finger and the portion of the palm therebetween to transmit torque to the rotational grip. The deflection of the hubs as in the case of the ribs will provide for the transmission of torque in the presence of any debris such as mud which may be deposited on or between the nubs and the ribs and grooves.

20 Claims, 3 Drawing Sheets

U.S. PATENT DOCUMENTS

| | | | |
|---|---|---|---|
| 4,900,291 | 2/1990 | Patterson | 474/80 |
| 4,938,733 | 7/1990 | Patterson | 474/80 |
| 4,941,232 | 7/1990 | Decker et al. | 74/551.9 X |
| 4,946,425 | 8/1990 | Bühlmann | 474/80 |
| 5,059,158 | 10/1991 | Bellio et al. | 474/70 |
| 5,097,566 | 3/1992 | Decker et al. | 74/551.9 X |
| 5,102,372 | 4/1992 | Patterson | 474/80 |
| 5,125,286 | 6/1992 | Wilson | 74/551.9 |
| 5,134,008 | 7/1992 | Alm | 74/551.9 X |
| 5,134,897 | 8/1992 | Romano | 74/489 |
| 5,145,210 | 9/1992 | Lennon | 280/281.1 |
| 5,186,071 | 2/1993 | Iwasaki | 74/489 |
| 5,197,927 | 3/1993 | Patterson et al. | 474/80 |
| 5,224,397 | 7/1993 | Yoo | 74/558 |
| 5,241,877 | 9/1993 | Chen | 74/489 |
| 5,261,858 | 11/1993 | Browning | 474/69 |
| 5,287,767 | 2/1994 | Engelstein | 74/558 |

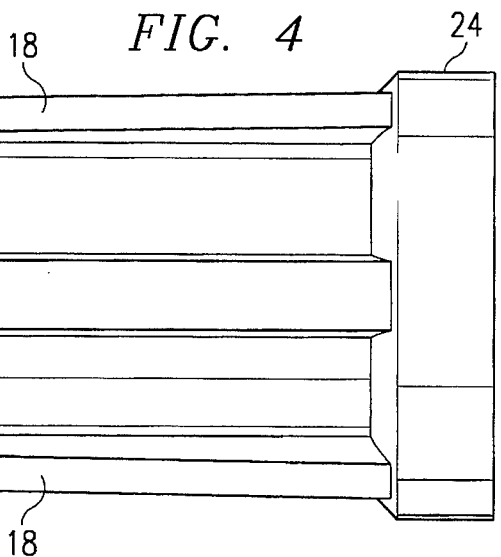
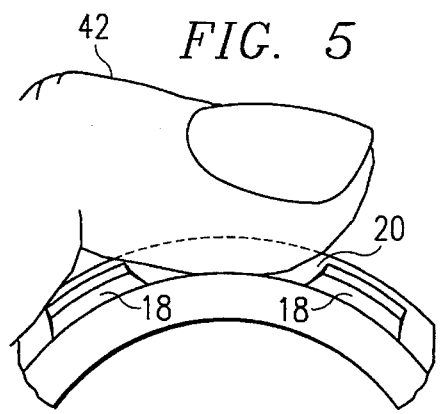
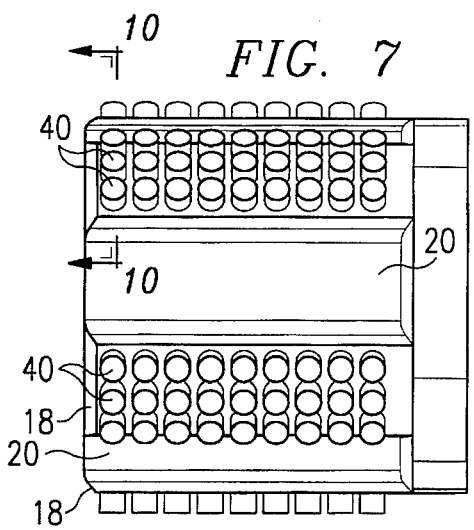
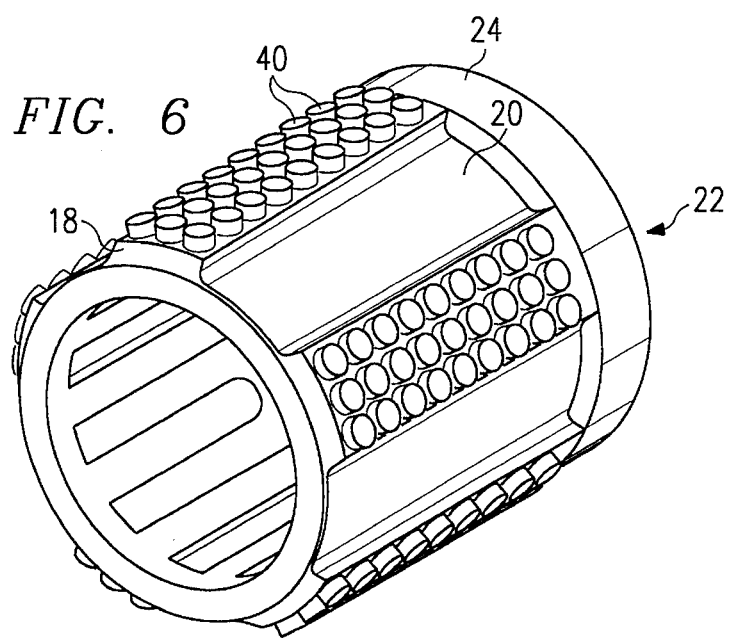

ROTATABLE GRIP FOR DERAILLEUR TYPE BICYCLE GEAR SHIFTING SYSTEM

This application is a continuation-in-part of application Ser. No. 08/207,249 filed Mar. 7, 1994, now U.S. Pat. No. 5,476,019.

BACKGROUND OF THE INVENTION

I. Field of the Invention

This invention relates to a rotatable grip for actuating a derailleur type bicycle gear shifting system. More particularly, it relates to providing a gripping surface which is readily engaged by the thumb and index finger and possibly the middle finger, and the part of the palm between the thumb and index finger, while the remaining fingers of the hand encircle the normal hand grip on the handle bar, to move a cable which actuates the shifting mechanism.

II. Description of Related Art Including Information Disclosed Under 37 C.F.R. §§ 1.97 and 1.98

Derailleur type shifting mechanism for bicycles have in the past been actuated by levers supported on the handle bar or other fixed portions of the bicycle. The use of such levers normally requires the removal of a rider's hand from a hand grip in order to operate the lever to shift gears. This, of course, could contribute to the loss of steering control of the bicycle. However, shift actuators were later provided which are conveniently rotatably mounted on a handle bar and positioned so as not to require the rider to remove a hand from the hand grip to operate the shift actuator. One such shift actuator is disclosed in U.S. Pat. No. 4,900,291 issued Feb. 13, 1990 to one of the co-inventors of this application and assigned to the assignee of this application. Other patents assigned to the same assignee, which disclose rotatable shift actuators mounted on a handle bar inboard of the normal hand grip, are U.S. Pat. No. 4,938,733 issued Jul. 3, 1990, U.S. Pat. No. 5,102,372 issued Apr. 7, 1992, and U.S. Pat. No. 5,197,927 issued Mar. 30, 1993. The bicycle derailleur system in all of the above-mentioned patents is actuated by a rotatable grip which is located on the handle bar inboard of the normal hand grip. The gripping surface of rotatable grips currently sold by the assignee of this application, prior to this invention, were typically formed of foam rubber or neoprene which is secured to an underlying rotatable member of the actuating system. The outer surface of the foam rubber or neoprene rotatable grip was typically smooth, as shown in FIGS. 33 and 40 of U.S. Pat. No. 5,102,372 and FIGS. 21 and 40 of U.S. Pat. No. 5,197,927 referenced above.

While the above-referenced U.S. Pat. No. 4,900,291 in FIGS. 46 through 50, and U.S. Pat. No. 4,938,733 in FIGS. 46 through 58, and 67 reveal axially extending ribs formed on the outer gripping surface, such grips were found unsatisfactory by users and were discontinued. The grips with axially extending ribs as shown in these patents were formed of a hard plastic material such as ABS. The hard plastic grip with the axially extending grooves was in the past offered for sale as a commercial product, but was not well received. The ridges, being formed of hard plastic, presented harsh sharp edges to the operator's thumb and fingers. That is, when an operator would apply pressure to the edges of the ridges with a thumb and finger, or fingers, the edges would with repetitive shifting cause the thumb and finger or fingers to become sore and possible bruised or cut. The harsh sharp edges, taken in conjunction with normal bicycle motions, including bouncing of the bike, made it most uncomfortable to operate the grooved hard plastic rotatable grips. Thus, the hard plastic grip with ridges was quite quickly replaced with a smooth grip of a softer material as shown in the above-mentioned U.S. Pat. Nos. 5,102,372 and 5,197,927.

SUMMARY OF THE INVENTION

It is an object of this invention to provide a gripping or operating surface on a rotatable grip for providing handle bar actuation of a derailleur-type bicycle gear shift system which more readily and comfortably transmits torque from the operator's thumb and index finger and the portion of the palm therebetween and possible middle finger to the shift system. It is another object of the invention to provide a rotatable grip for the actuation of a derailleur-type bicycle gear shift system which not only provides for increased transmission of torque, but which is also comfortable to the thumb and index finger and the portion of the palm therebetween when applying torque to cause actuation of the gear shift system. It is a further object of this invention to provide an operating surface for a rotatable grip which will remain useful as a torque transmitting member in the presence of mud and debris. It is a still further objection of this invention to provide an operating surface for a rotatable grip which provides for increased transmission of torque while yet providing a comfortable surface to the operator's thumb and index finger and the portion of the palm therebetween while transmitting torque thereto.

In accordance with this invention, a rotatable grip is provided with an operating surface in the form of a resilient cylindrical body which provided with axially extending ribs on the outer surface. The axially extending ribs are of a width and are spaced such that the thumb and index finger and the portion of the palm therebetween readily engage at least two or more of the ribs for transmitting torque to cause rotation of the grip. The ribs provide an enhanced gripping surface and will remain useful to transmit torque in the presence of any foreign matter such as mud which may have been deposited on the grip. Unless the ribs protrude above and beyond the mud and debris, the foreign matter, especially mud, will reduce the ability of the thumb and index finger and the portion of the palm therebetween to transmit torque to the grip. The ribs are uniformly placed around the cylindrical surface such that they fit naturally into the crooks of the rider's thumb and index finger and the portion of the palm therebetween.

In a further embodiment of this invention, the ribs are provided with radially extending nubs which provide enhanced torque transmission by presenting smaller surface areas which are deflected by engagement with the thumb and one or two fingers and the portion of the palm therebetween. The primary function of the ribs is to insure that a grippable surface protrudes above and beyond any debris which collects on the grip. A secondary function of the ribs is to improve torque transmission by providing a larger diameter operating surface with more engageable edges.

Wherein the rotatable grip is placed just in board of the customary hand grip, the ribs decrease in height toward the hand grip such that their diameters match at their point of juncture. Thus providing a smooth transmission between the customary hand grip and the rotatable grip. The rotatable grip may be further provided with an enlarged diameter surface at the inboard end, to which the operator may apply both axial and radial force to aid in the transmission of torque to the rotatable grip. Further, the enlarged diameter portion may be of frusta-conical shape and provided with axially extending ribs and/or nubs as is the cylindrical portion of the grip. The nubs further enhance the ability of the rotatable grip to remain useful in the presence of any foreign matter which may have become lodged thereon.

BRIEF DESCRIPTION OF THE DRAWINGS

FIG. 4 is a side plan view of the gripping member shown in FIG. 2.

FIG. 5 is an enlarged partial end view showing the engagement of the ribs of the gripping member shown in FIG. 2 by a finger of an operator.

FIG. 6 is a perspective view of a second embodiment of the gripping member of this invention.

FIG. 7 is a side plan view of the gripping member shown in FIG. 6.

DETAILED DESCRIPTION OF THE PREFERRED EMBODIMENT

Figure 1:
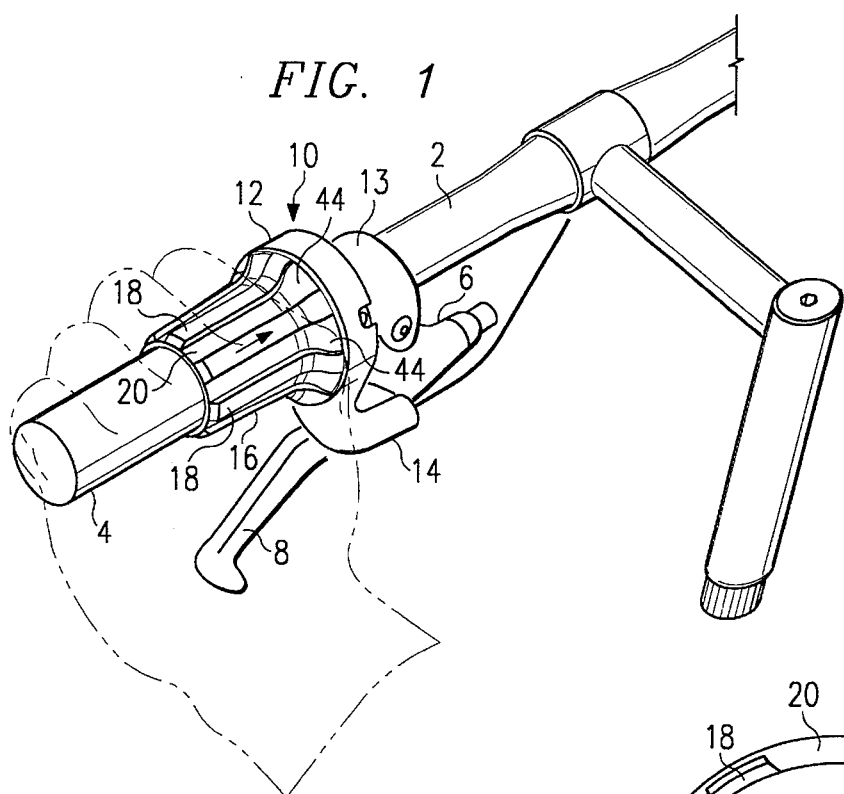
FIG. 1 is a perspective view of a portion of a bicycle handle bar showing a customary hand grip and breaking lever, with a twist grip for actuation of a derailleur-type bicycle gear shift system having a gripping member in accordance with this invention mounted therebetween.
Figure 3:
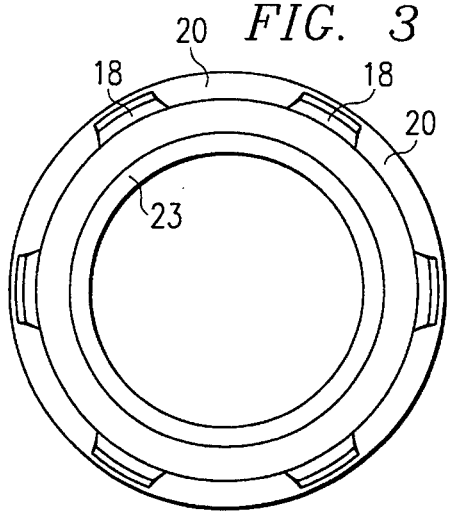
FIG. 3 is a cross-sectional view of the gripping member shown in FIG. 2.
Figure 2:
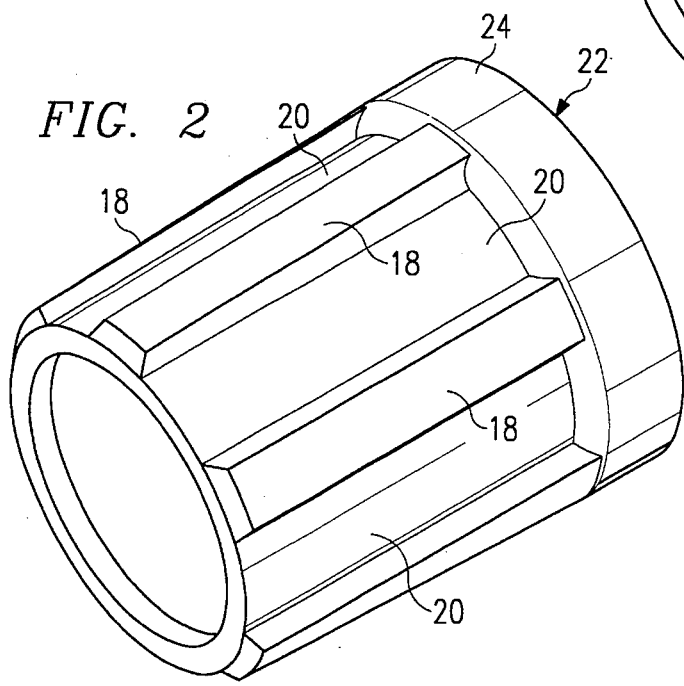
FIG. 2 is an enlarged perspective view of a second embodiment of the cylindrical gripping member of this invention.
Figure 8:
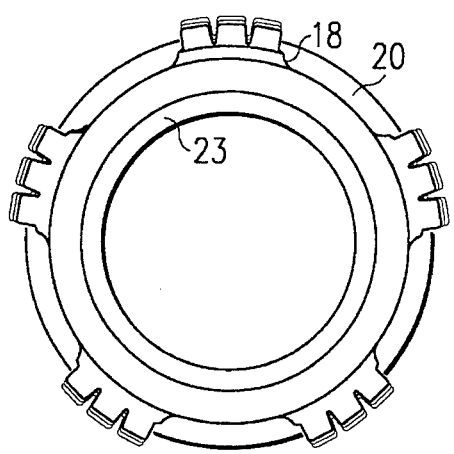
FIG. 8 is an end plan view of the gripping member shown in FIG. 6.

Referring to FIG. 1, a rotatable grip for the actuation of a derailleur-type bicycle gear shift system in accordance with the preferred embodiment of this invention will be described. Mounted at the end of a handle bar 2 is a customary hand grip 4. Also mounted on and secured to the handle bar 2 is a brake operating mechanism 6 which includes a pivotally mounted operating handle 8. Received over the handle bar between the customary hand grip 4 and the brake actuating member 6 is a rotatable grip actuating mechanism 10 for a derailleur-type bicycle gear shift system.

The rotatable grip actuating mechanism 10 includes a housing 12 which is secured to the handle bar and includes a portion 14 to which the Bowden cable type actuating mechanism is connected. A rotatable grip 16 is provided for actuation of the derailleur-type gear shift system between the customary handle grip 4 and the housing 12. As shown in FIG. 1, the outer surface of the rotatable grip 16, which is engaged by the operator's thumb and index finger and the portion of the palm therebetween is provided with alternating ribs 18 and grooves 20, in accordance with one of the preferred embodiments of this invention.

A first embodiment of the cylindrical operating surface for a rotatable grip in accordance with this invention will be described with reference to FIGS. 2–5. A hollow cylindrical member 22 which provides a gripping surface is formed of a somewhat resilient material having a soft feel. A preferred material for forming the gripping surface is a thermoplastic elastomer such as KRATON® manufactured by Shell. The material of which the cylindrical member 22 is formed is stretched such that it may be positioned over a rigid cylindrical member 23 (see FIGS. 3 and 6) which is rotated to actuate the Bowden cable. When released, the cylindrical member 22 will tightly grip the surface of the rigid member 23. The ribs 18 and the grooves 20 are spaced such that they are readily positioned in the crooks of an operator's finger and thumb and the portion of the palm therebetween.

The grip is formed with an enlarged cylindrical ring 24 at the in board end. The grip shown in FIGS. 2–5 is assembled with a housing 12, such as shown in FIG. 1, which is provided with a cylindrical opening to receive the enlarged cylindrical ring 24. With the enlarged cylindrical ring 24 extending into the housing 12, the ends of the ribs 18 will be adjacent to the outboard edge of the housing 12. The housing 12 has a portion with an exterior, substantially cylindrical surface 13 which is of substantially greater radius than the outer surface of ribs 18 or grooves 20 in the embodiment shown in FIGS. 2–5.

The height of the ribs in a preferred embodiment decrease from the ring 24 to the end adjacent the grip 4, such that the outer diameter of the ribs 18 match that of the abutting surface of the customary hand grip 4. The manner in which the ribs 18 and grooves 20 are received in the crooks of an operator's thumb or fingers is shown in FIG. 5. With the multiple points of engagement as shown in FIG. 5, the operator is able to transmit more torque to the rotatable grip 16, more effectively applied over a greater surface area and diameter. Also as seen in FIG. 5, the ribs are sufficiently spaced apart that the finger 42 can engage both the base surface of groove as well as a sidewall of an adjacent rib 18.

Figure 10:
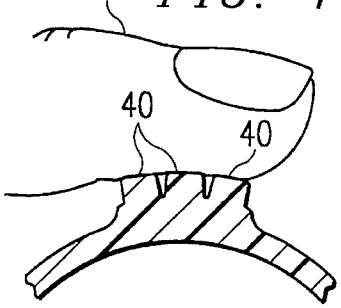
FIG. 10 is an enlarged partial cross-sectional view of the gripping member of FIG. 6 showing the application of a force thereto by an operator's finger.
Figure 9:
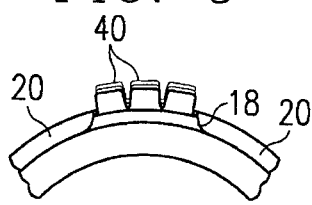
FIG. 9 is an enlarged segment of the plan view shown in FIG. 8.
Figure 11:
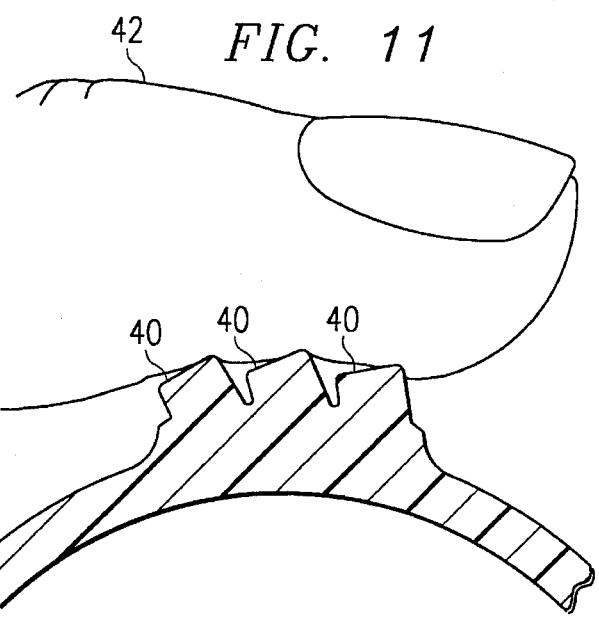
FIG. 11 is a further enlarged cross-sectional view of the gripping member of FIG. 6 showing the initial deflection of the nubs with the application of a pressure by an rider's finger.

In a second embodiment of this invention, as shown in FIGS. 6–11, the outer surface of the ribs 18 are provided with nubs 40 which in a preferred embodiment are spaced in a regular array over the surface of the ribs. These hubs serve to further enhance the gripping surface of the rotatable grip. The nubs 40 are rounded at their outer ends as best seen in FIGS. 10 and 11 so as to provide a comfortable surface for engagement with the operator's thumb and fingers and the portion of the palm extending therebetween. As shown in FIG. 10, the contour of the operator's finger 42 is readily engaged by the nubs 40 which fall under the finger or thumb. Upon the application of pressure to rotate the grip, the nubs are first deflected as shown in FIG. 11. However, upon the application of even more torque, the trailing edge of the nubs will lift to engage the finger and thumb, thereby providing an increased nub height and hence an increased diameter for the transmission of torque. As previously set forth, the deflection of the hubs 40, is also effective in providing useful torque transmitting features in the presence of foreign matter on the grip.

Referring again to FIG. 1, it will be seen that in a third embodiment of this invention an enlarged frusta-conical portion 44 of the gripping surface is also provided with ribs 18, such that as both axial and tangential forces may apply to the frusta-conical portion 44 and particularly the ribs 18 and/or nubs 40 thereon by the thumb and finger and the portion of the palm therebetween, thereby increasing the torque which may be transmitted to the rotatable grip 16.

Figure 12:
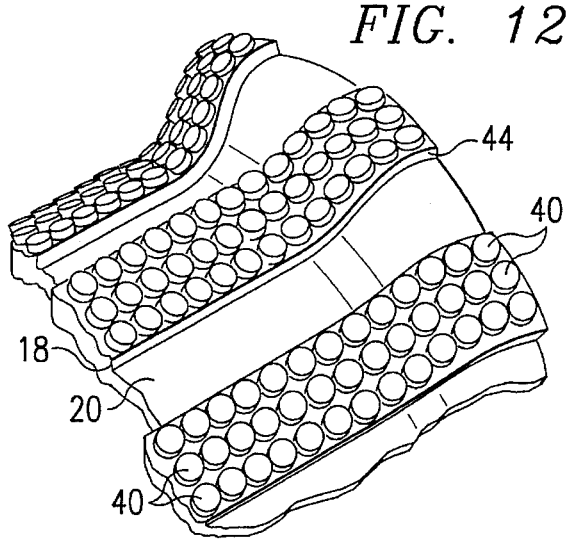
FIG. 12 is an enlarged detail of a third embodiment of a gripping member according to the invention.

Referring to FIG. 12, in still another embodiment of this invention, the ribs 18 which extend over the frusta-conical portion 44 are also provided with nubs 40. Again, the provision of the nubs 40 on the frusta-conical portion 44 further enhances the ability of an operator to deliver torque to the rotatable grip and also to provide useful torque transmitting features in the presence of foreign matter which would otherwise impair the ability of an operator to transmit torque to the rotatable grip.

In the embodiments illustrated in FIGS. 1, 11 and 12, it can be seen that the major, more inboard diameter of the frusta-conical portion 44 substantially matches that of exterior cylindrical surface 13 of housing 12, while the minor, more outboard diameter of the frusta-conical portion 44 is the same as that of the outboard-disposed cylindrical portion of the surface of grip 16.

In a preferred embodiment of this invention, the ribs and grooves of operating surface for the rotatable grip have the following dimensions in inches:

Rib length: 1.2–1.6

Rib width at the top: 0.23–0.25

Rib width at the bottom: 0.26–0.30

Rib height: 0.040–0.050

Space between ribs: 0.39–0.42

When in accordance with this invention, the grip cover is provided with nubs, in a preferred embodiment, the operating surface for the rotatable grip has the following dimensions:

Rib length: 1.1–1.3

Rib width at the top: 0.36–0.38

Rib width at the bottom: 0.38–0.4

Rib height: 0.040–0.050

Space between ribs: 0.41–0.43

Nub diameter: 0.100

Nub spacing between centers: 0.10–0.130

Nub height: 0.040–0.050

These dimensions are measured after the cylindrical member 22 has been stretched over and released to tightly engage the rigid cylindrical operating member of the rotatable grip.

While several embodiments of the invention have been shown, it should be apparent to those skilled in the art that what has been described are considered at the present to be the preferred embodiments of the rotatable grip of this invention. In accordance with the Patent Statutes, changes may be made in the operating surface of the rotatable grip of this invention without actually departing from the true spirit and scope of this invention. The following claims are intended to cover all such changes and modifications which fall in the true spirit and scope of this invention.

What is claimed:

1. A hand-rotatable shift actuator adapted to be coaxially mounted over a bicycle handlebar, said shift actuator comprising:

a rotating member adapted to be rotated with respect to said handlebar to actuate a control cable of a bicycle gear shifting system and having an axis and a cylindrical exterior;

a resilient grip mounted on said cylindrical exterior of said rotating member and having an outer surface; and a plurality of elongated ribs formed in parallel with said axis on said outer surface, a plurality of elongated grooves angularly spacing apart adjacent ones of said ribs, each of said grooves having a base surface, an outer surface of each of said ribs being radially outwardly displaced from the base surface of an adjacent one of said grooves by a sidewall having a predetermined height, an angular extent of said grooves and said height of said sidewalls being preselected such that said grip is adapted to be engaged by a thumb, at least an index finger, and a palm therebetween of a hand of a rider in such a way that said ribs engage only the crooks of the rider's hand formed by said thumb, finger and palm therebetween.

2. The shift actuator of claim 1, wherein said ribs have an axial length in the range of 1.1 to 1.6 inches inclusive.

3. The shift actuator of claim 1, wherein said shift actuator is adapted to be mounted on the handlebar inboard of a customary handgrip affixed to the handlebar, said height of said sidewalls decreasing toward said customary handgrip so as to provide a smooth transition to said customary handgrip such that the outer diameter of said ribs adjacent said customary handgrip is similar to an outer diameter of the customary handgrip.

4. The shift actuator of claim 1, wherein said grip is adapted to be mounted on said handlebar inboard of a customary handgrip affixed to the handlebar, said outer surface of said ribs corresponding in diameter to the diameter of the customary handgrip.

5. The shift actuator of claim 1, wherein said grip has no more than six of said ribs.

6. The shift actuator of claim 1, wherein the spacing apart of said ribs is at least 0.39 inches.

7. The shift actuator of claim 1, wherein said predetermined height of said sidewalls is at least 0.04 inches.

8. The shift actuator of claim 1, wherein the outer surfaces of said ribs but not said grooves are provided with nubs, each of said nubs having a radially outward surface area, said surface areas of said nubs adapted to be deflected by engagement by the thumb and one or more fingers and the portion of the palm therebetween of the rider.

9. The shift actuator of claim 8, wherein each of said nubs has a leading edge and a trailing edge opposed to said leading edge, said nubs on said ribs deform upon application of the index finger, thumb and palm therebetween of the rider such that the leading edges of said nubs will be depressed and the trailing edges thereof will be elevated to provide a greater diameter and to protrude above any foreign matter on the grip so as to provide enhanced transmission of torque.

10. A hand-rotatable shift actuator adapted to be coaxially mounted over a bicycle handlebar, said shift actuator comprising:

a rotating member adapted to be rotated with respect to said handlebar to actuate a control cable of a bicycle gear shifting system and having an axis and a cylindrical exterior;

a resilient grip mounted on said cylindrical exterior of said rotating member and having an outer surface; and a plurality of elongated ribs formed in parallel with said axis on said outer surface, a plurality of grooves angularly spacing apart adjacent ones of said ribs, each said groove having a base surface, an outer surface of each of said ribs being radially outwardly displaced from said base surface of an adjacent one of said grooves by sidewalls of a predetermined height, an angular spacing of said grooves and said height of said sidewalls being preselected such that each said groove is adapted to receive a thumb, or at least one finger, of a hand of a rider in such a way that the thumb or finger of the rider contacts said base surface of said groove and at least one of said sidewalls to enhance torque transmission from the hand of the rider to said grip.

11. The shift actuator of claim 10, wherein a ratio of the height of said ribs to the width of said ribs is such that they are prevented from folding over and deforming into an adjacent one of said grooves when engaged by the rider's thumb and fingers and the portion of the palm therebetween.

12. The shift actuator of claim 10, wherein the width of said ribs is greater between the base surfaces of adjacent one of said grooves than at said outer surface of said ribs, such that each of said ribs is prevented from folding over and deforming into an adjacent one of said grooves when engaged by the rider's thumb and fingers and the portion of the palm therebetween.

13. The shift actuator of claim 10, wherein said grip has no more than six of said ribs.

14. The shift actuator of claim 10, wherein the spacing apart of said ribs is at least 0.39 inches.

15. The shift actuator of claim 10, wherein said predetermined height of said sidewalls is at least 0.04 inches.

16. A hand-rotatable shift actuator adapted to be coaxially mounted over a bicycle handlebar, said shift actuator comprising:

a rotating member adapted to be rotated with respect to said handlebar to actuate a control cable of a bicycle gear shifting system, said rotating member having a generally cylindrical exterior and an axis;

a resilient grip mounted on said cylindrical exterior of said rotating member and having an outer surface, said outer surface having a generally cylindrical outboard portion with a predetermined diameter and a frusta-conical inboard portion adjoining said generally cylindrical portion, a minor diameter of said frusta-conical portion matching said diameter of said generally cylindrical portion, a major diameter of said frusta-conical portion displaced in an inboard direction from said minor diameter and being sufficiently spaced both axially and radially from said minor diameter that a substantial sloped surface is formed for receiving both radially inward and axially inboard directed pressure from a thumb, index finger and palm therebetween of a hand of a rider; and a plurality of resilient, upstanding nubs formed on said generally cylindrical portion of said grip and on said frusta-conical portion of said grip and adapted to enhance transmission of torque from the hand of the rider to said grip.

17. The shift actuator of claim 16, and further comprising a housing having a portion adapted to be affixed to said handlebar to be adjacent to and inboard from said grip, said portion of said housing having an outer surface, a diameter of said outer surface of said portion of said housing substantially matching said major diameter of said frusta-conical portion, said frusta-conical portion adapted to prevent contact between the hand of the rider and said housing.

18. A hand-rotatable shift actuator adapted to be coaxially mounted over a bicycle handlebar, said shift actuator comprising:

a rotating member adapted to be rotated with respect to said handlebar to actuate a control cable of a bicycle gear shifting system, said rotating member having a generally cylindrical exterior and an axis;

a resilient grip mounted on said cylindrical exterior of said rotating member and having an outer surface, said outer surface having a generally cylindrical outboard portion with a predetermined diameter and a frusta-conical inboard portion adjoining said generally cylindrical portion, a minor diameter of said frusta-conical portion matching said diameter of said generally cylindrical portion, a major diameter of said frusta-conical portion displaced in an inboard direction from said minor diameter and being sufficiently spaced both axially and radially from said minor diameter that a substantial sloped surface is formed for receiving both radially inward and axially inboard directed pressure from a thumb, index finger and palm therebetween of a hand of a rider; and a plurality of elongated ribs formed on at least said generally cylindrical portion of said outer surface and in parallel with said axis, a plurality of elongated grooves angularly spacing apart adjacent ones of said ribs, each of said grooves having a base surface, an outer surface of each of said ribs being radially outwardly displaced from the base surface of an adjacent one of said grooves by a sidewall having a predetermined height, an angular extent of said grooves and said height of said sidewalls being preselected such that said grip is adapted to be engaged by a thumb, at least an index finger, and a palm therebetween of a hand of a rider in such a way that said ribs engage only the crooks of the rider's hand formed by said thumb, finger and palm therebetween.

19. The shift actuator of claim 18, wherein said frusta-conical portion is provided with said ribs.

20. The shift actuator of claim 18, wherein the spacing apart of said ribs is at least 0.39 inches.

* * * * *